Patented Nov. 5, 1929

1,734,413

UNITED STATES PATENT OFFICE

CHARLES L. YOUNG, OF MINNEAPOLIS, MINNESOTA, ASSIGNOR OF ONE-HALF TO CHARLES A. PROSSER, OF MINNEAPOLIS, MINNESOTA

EMULSIFIED PLASTIC AND PAINT

No Drawing.  Application filed March 20, 1926. Serial No. 96,303.

This invention relates to the production of and method of making paints and plastics, for use in the decorative arts, and has among its objects to produce a cheap plastic material usable as a paint for all kinds of decorative work; which is made up as a thick batter or paste and which can be thinned in water in any desired degree to produce a brush-on material of any consistency; which can be used as a thick batter or plastic for decorative purposes; which has exceedingly great covering power, when thinned, for application by brush or spray; which is substantially insoluble in water after hardening; which can, before hardening, be easily removed from the hands by washing or wiping; which, when diluted in any degree by water, will hold the dry pigments used in paint; which can be used as a sizing, over which ordinary paint can be applied; which can be used as a size for calcimine; which, after application to a surface whitens or bleaches instead of becoming yellow; and which can be used as a material for producing molding, or as a material which can be molded.

Although a large number of experiments have been conducted in producing this paint, the most satisfactory procedure at present is given as an example as follows: 40 lbs. of whiting and 2 gals. of hot water are mixed together as a batter. 1½ lbs. of hide glue is soaked in cold water, then heated to boiling and added to the hot water mixture of whiting and all well mixed while hot. 8 lbs. of bleached pine resin is then dissolved in one gal. of benzine and heated and to the mixture is added one gal. of bleached boiled linseed oil which is also heated. The linseed oil and solution of resin in benzine are then mixed while hot and this mixture is then added to the hot mixture of whiting, glue and water and the whole thoroughly ground. ¼ lb. of salicylic acid is then mixed in a little warm water and added to the hot mixture while stirring. A heavy paste is produced which upon cooling becomes heavier and stiffer. When mixed in the quantity stated, 6½ gals. of heavy paint is produced which when thinned to the consistency of paint for brushing on produces thirteen gallons. Moreover the mixture thus produced will not settle when thinned out for use.

The above formula will produce the paint having all the qualities herein enumerated; however, for certain uses a whiter paint is produced by adding one ounce of cobalt blue to the mixture of whiting and water.

If it is desired to make the paint harder after setting, three-fourths (¾) of a lb. of plaster of Paris is added to each gallon of paint to be produced.

If a hygroscopic substance is needed, eight ounces of hot glycerine is also added to the mixture above mentioned. The function of the glycerine is a hygroscopic one and merely prevents the applied paint from drying or setting too quickly.

If a substance is needed which will possess the property of increased resistance to the penetration of moisture vapor, varying amounts of fish oil may be substituted together with a dryer in place of linseed oil. Experiments thus far carried on seem to indicate that the best results in increasing such resistance to moisture vapor would be secured by substituting fish oil for linseed oil and by also adding for each gallon of the mixture, 2 ounces of gutta percha dissolved by heat in solution with benzine or comprising equivalent solvent. The same results would be gained by using heated fish oil or heated linseed oil as a thinning agent instead of water. The addition of fish oil or gutta percha or both also operates to make the surface of the mixture when applied less porous and thereby not only increases its resistance to attack by water or moisture in any form but also improves such a surface as an undercoat for the application of gloss paint.

An emulsion is formed, and thus far it has been found that emulsion does not take place satisfactorily without the addition of a definite quantity of resin in solution. The resin is believed to not only produce, or greatly assist in producing, the emulsion, but to maintain the mixture in an emulsified condition. Moreover, the heating of the ingredients before mixing and the maintenance of heat during the mixing operation is believed necessary for the production of plastic and paint having all of the properties herein enumerated. It is further believed that the emulsion produced will not take place without the application of a certain amount of heat, in the presence of resin. An emulsion is herein successfully produced in a mixture containing water, oil and resin.

Coloring material may be added at any station during the mixing process either while in plastic form, during the heating, after emulsion has taken place, while thinning, after thinning, or at any later time. Equally good results were obtained in experiments where the coloring matter was added while mixing or after the batch had stood for considerable time.

The cost of material for the plastic paint herein described is at least 50% less than the cost of ordinary paint now in use and the labor cost of applying one coat of paint is saved on all jobs. A saving of from 65 to 75% is therefore made and this saving is due to three causes: first, the cost of material is less; second, the paint can be used as a size and undercoat, thus eliminating sizing or undercoating; and third, the labor cost of applying one of these coats.

Although the formula given at the present time seems the best of those experimented with, the following equivalent materials, with very slight variation in proportion, have been successfully used in making the plastic paint herein described and claimed. For this reason the equivalents are enumerated as follows:

Oils: boiled linseed oil or bleached boiled linseed oil, oil obtained from flaxseed, or any drying oil or synthetic equivalent; or fish oil together with a dryer.

Varnish: gloss oil varnish or hard oil varnish, or varnish obtained from pine resin dissolved in benzine, or any other solvent for resin.

Glue: any gelatinous substance, or a glue made from animal or vegetable stocks.

Glycerine: any polyhydric alcohol or sugar or starch derivatives.

By experiment it has been found that both organic and inorganic substances can be used as a preservative for the glue and zinc sulphate is one of the substances found to give good results, the amount being expressed in percentage terms of weight of the preservative to weight of glue; in this instance about 20.27% (or .2027).

The following paint bases have been experimented with and found to be substantially equivalent to the whiting of the formula.

Compounds of the alkaline earths, such as calcium carbonate and:
Barytes and allies, as blancfixe;
China clay and allies, as white bole;
Gypsum and allies, as terra alba;
Silica and allies, as silex;
Zinc white;
Lithopone.

I do not limit myself as to the exact substances enumerated in the formula but reserve the right to use equivalent substances. For instance, although the whiting of the formula is cheaper, I may use other calcium carbonates and other alkaline earths and inasmuch as some calcium carbonates and alkaline earths are whiter, the need for the cobalt blue as a bleaching substance is unnecessary. Moreover, depending on the setting quality desired, the plaster of Paris may be used or omitted or used in varying quantities. Moreover I reserve the right to substitute for the linseed oil China wood oil or fish oil or other oils having similar properties because such oils are lighter in color, cheaper or possess better moisture resisting properties.

The use of the calcium carbonate produces a paint which becomes whiter with age. Lithopone may also be used inasmuch as it is one of the whitest paint bases but is more expensive than calcium carbonate or whiting or some other alkaline earths. It will be understood that with the use of whiting the paint whitens when applied, and turns even whiter and remains so.

The following experimental uses are enumerated:

The substance has been successfully used as a size for calcimine, and generally for a size for many kinds of walls; as a rough wall size over which paint and paper were subsequently successfully applied; for plastic relief work, including moulding, ceiling decoration, panel work, for covering straw board, celotex and compo board in one coat; as a one-coat finish in natural color, and as one-coat finishes containing those coloring materials successfully used in other paints; as a one-coat covering with or without stippling; as a plastic substance for decorating picture moulding; as a substitute for whiting compound or putty compounds now in use; as a size and covering for old calcimined surfaces without removal of the calcimine; for similar use over a white-washed surface, without removal of the whitewash; and over wood both as a flat and as a final coat, applied with brush or paint gun; and as a one or more coat covering for cement, concrete, brick and special compo and other board surfaces.

By experiment it has been found that one coat of this material and one coat of paint is equivalent in covering power to three coats of ordinary paint. For example, as suggestive of its economic and commercial value, it has been found that one coat of the herein described and claimed material at one dollar a gallon overlaid with one coat of ordinary paint at two dollars per gallon has the covering and protecting power equal to three coats of other paint at three dollars per gallon.

In some cases, for instance, when painting over porous surfaces, such as celotex, one coat of the material, herein claimed, has proved to have the covering power of at least five coats of paint. This plastic and paint, is substanatially insoluble in water.

The following described mixture is a modification: 163 lbs. of whiting and 8¾ gallons of hot water are mixed together to a batter. 4⅝ lbs. of hide glue is soaked in cold water. This mixture is then heated to boiling and added to the hot water mixture of whiting and all is then well mixed while hot. 4 gallons of white bleached gloss oil varnish or gloss oil varnish unbleached or equivalent substance is then heated separately. 3¾ gallons of bleached or unbleached boiled linseed oil is also heated separately. The gloss oil and linseed oil are then mixed while hot and this mixture is then added to the hot mixture of whiting glue and water and the whole thoroughly stirred and ground. 1⅝ of a lb. of zinc sulphate is then mixed in a little warm water and added to the hot mixture while stirring. When mixed in the quantities stated 25 gallons of heavy paint is produced which when thinned to the consistency of ordinary paint for brushing on yields 50 gallons.

I claim as my invention:

1. A plastic and paint comprising a mixture of substances in the following proportionate quantities: forty pounds of whiting, two gallons of water, one and one-half pounds of hide glue, one gallon of bleached boiled linseed oil, eight pounds of bleached pine resin, one gallon of benzine, one-fourth pound of zinc sulphate.

2. A plastic and paint comprising a mixture of substances in the following proportionate quantities: forty pounds of whiting, one ounce of cobalt blue, two gallons of water, one and one-half pounds of hide glue, one gallon of bleached boiled linseed oil, eight pounds of bleached pine resin, one gallon of benzine, approximately three-fourth of a pound of plaster of Paris for each gallon of paint producible by the formula, eight ounces of glycerine, and one-fourth pound zinc sulphate.

3. A plastic and paint comprising a mixture of substances in the following proportionate quantities: forty pounds of whiting, two gallons of water, one and one-half pounds of glue, one gallon of linseed oil, eight pounds of resin and one gallon of benzine.

4. A plastic and paint comprising a mixture of substances in the following proportionate quantities: forty pounds of whiting, one ounce of cobalt blue, two gallons of water, one and one-half pounds of hide glue, one gallon boiled linseed oil, eight pounds of bleached pine resin, one gallon of benzine and approximately three-fourths of a pound of plaster of Paris for each gallon of paint producible by the formula.

5. A plastic and paint comprising a mixture of substances in the following proportionate quantities: forty pounds of whiting, one ounce of cobalt blue, two gallons of water, one and one-half pounds of hide glue, one gallon of bleached boiled linseed oil, eight pounds of bleached pine resin, one gallon of benzine, approximately three-fourths of a pound of plaster of Paris for each gallon of paint producible by the formula, one-fourth pound of zinc sulphate.

6. A plastic and paint comprising a mixture of substances in the following proportionate quantities: forty pounds of whiting, one ounce of cobalt blue, two gallons of water, one and one-half pounds of hide glue, one gallon of bleached boiled linseed oil, eight pounds of bleached pine resin, one gallon of benzine, and approximately three-fourths of a pound of plaster of Paris for each gallon of paint producible by the formula.

In witness whereof, I have hereunto set my hand this thirteenth day of March, 1926.

CHARLES L. YOUNG.